United States Patent Office 3,507,819
Patented Apr. 21, 1970

---

3,507,819
CATALYTIC ESTERIFICATION OF EPOXY RESINS
Geert C. Vegter and Feije H. Sinnema, Amsterdam, Netherlands, assignors to Shell Oil Company, New York, N.Y., a corporation of Delaware
No Drawing. Filed Feb. 20, 1967, Ser. No. 617,067
Claims priority, application Netherlands, Feb. 22, 1966, 6602240
Int. Cl. C09d *3/58, 3/26;* C08g *30/04*
U.S. Cl. 260—18                               7 Claims

ABSTRACT OF THE DISCLOSURE

When epoxy resins are esterified with fatty acids in the presence of stannous oxide, stannous hydroxide or stannous salts of weak acids, the cooking time is significantly reduced and the viscosity increase of the reaction mixture during cooking is suppressed.

---

This invention relates to a process for the preparation of binder compositions prepared by the esterification of epoxy resins with fatty acids. More particularly, the invention provides an improved process for the preparation of epoxy resin esters of fatty acids wherein the esterification reaction is performed in the presence of certain tin compounds such as stannous oxide, stannous hydroxide and stannous salts of weak acids.

Epoxy resins esterified with fatty acids are used in practice as binder compositions for paints, lacquers and varnishes. The preparation of these compositions, with or without the use of alkaline catalysts to accelerate the esterification reaction, is sufficiently known from the literature (see for example, U.S. Patents 2,456,408 and 2,653,141; as well as the textbook "Epoxydverbindungen und Epoxyharzen" A.N. Paquin, Springer Verlag 1958, and the Journal Peinture, Pigmentset Vernis 33 (1957), pp. 206–8).

The use of known alkaline catalysts, such as calcium oxide, sodium carbonate, zinc oxide, lead oxide, potassium hydroxide and calcium naphthenate for the esterification of epoxy resins with fatty acids; however, has various drawbacks. Some of these catalysts are insufficiently active, so that the time necessary for the esterification reaction cannot be shortened as desired, while other compounds which do have an attractive catalytic activity have the drawback of causing an undesirable excessive rise in viscosity and discloration of the reaction mixture during the esterification and particularly towards the end of the reaction.

Applicants have unexpectedly discovered that when certain tin compounds are used as catalysts for epoxy resin esterification, the esterification is considerably accelerated while significantly controlling the viscosity and discoloration, i.e., there is no undesirable rise in viscosity and no discoloration of the reaction mixture.

It is therefore the primary object of the present invention to provide an improved process for esterifying epoxy resins with fatty acids wherein the esterification reaction is significantly accelerated without the undesirable increase in viscosity and discoloration. This and other objects will become apparent to one skilled in the art from the following disclosure.

The term "esterification of fatty acids" is used herein to indicate the direct reaction of epoxy groups and/or hydroxyl groups of the epoxy resins with the carboxyl groups of the fatty acids. Reactions in which esterified epoxy groups are formed by re-esterification of fatty acids, as for example fatty oils, with epoxy resins, are therefore excluded.

The polyepoxide materials which may be used in preparing the esters of the present invention comprise those organic materials which have more than one vic-epoxy group, i.e., more than one

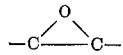

group, which group may be in a

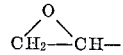

group, or in an internal position, i.e., a

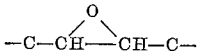

The polyepoxide may be saturated or unsaturated, aliphatic, cycloaliphatic, aromatic or heterocyclic and may be substituted with substitutents such as chlorine, hydroxyl groups, ether radicals, and the like.

Examples of such polyepoxides include, among others 1,4 - bis(2,3-epoxypropoxy)benzene, 1,3-bis(2,3-epoxypropoxy)benzene, 4,4'-bis(2,3-epoxypropoxy)octane, 1,4-bis(2,3 - epoxypropoxy)cyclohexane, 4,4'-bis(2-hydroxy-3,4'-epoxybutoxy)diphenyl dimethylmethane, 1,3-bis(4,5-epoxypentoxy-5-chlorobenzene, 1,4-bis(3,4-epoxybutoxy)-2 - chloroxyclohexane, 1,3 - bis(2-hydroxy-3,4-epoxybutoxy)benzene, 1,4-bis(2-hydroxy-4,5-epoxypentoxy)benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include among other, resorcinol, catechol, hydroquinone, methyl resorcinol, or polynuclear phenols, such as 2,2-bis(4-hydroxyphenyl) propane (bisphenol A), 2,2-bis(4-hydroxyphenyl)butane, 4,4' - dihydroxybenzophenone, bis(4-hydroxyphenyl)ethane, 2,2-bis(4-hydroxyphenyl)-pentane 1,1,2,2-tetrakis(4-hydroxyphenyl)ethane, 1,5-dihydroxynaphthalene, and that class of phenol-formaldehde resins known as the novolacs. The halogen-containing epoxides may be further exemplified by 3-chloro-1,2-epoxybutane, 3-bromo-1,2-epoxyhexane, 3-chloro-1,2-epoxyoctane, and the like. By varying the ratios of the phenol and epichlorohydrin one obtains different molecular weight products as shown in U.S. 2,633,458.

The preparation of four suitable glycidyl polyethers of dihydric phenols is illustrated in U.S. 2,633,458 and are designated polyethers A, B, C, and D. Other suitable polyepoxides comprise the polyether F disclosed in U.S. 2,633,458. Other very suitable polyepoxides are disclosed in U.S. 2,633,458.

The preferred epoxy resins discussed in this specification are resins which may be obtained by reacting divalent or polyvalent hydroxy compounds such as polyvalent alcohols, including glycerol, glycols, and pentaerythritol and polyvalent phenols such as bisphenol A, catechol, resorcinol, and the like, with epoxyhalogen compounds such as epichlorohydrin. Preferably, glycidyl polyether resins are used which have been prepared by condensation of epichlorohydrin with polyhydric alcohols or polyhydric phenols and more preferably with divalent phenols, for example under the action of alkalis, such as sodium hydroxide or potassium hydroxide. Very good glycidyl polyether resins are those which can be prepared with 2,2-di(4- hydroxyphenyl)propane. The reaction products formed can be represented by the formula:

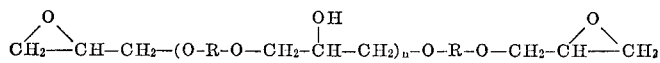

in which R represents the divalent diphenylpropane radical

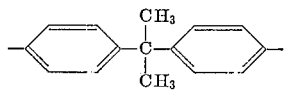

and $n$ has an average value of from about 0 to about 12. During the preparation some of the terminal glycidyl groups may be hydrated to

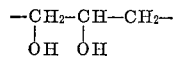

groups by reaction with water. If the glycidyl polyethers are mixtures of various components, $n$ may be a fractional number. A number of the chains present may contain phenol groups as terminal groups, while also part of the terminal glycidyl groups may be present in hydrated form. The number of reactive groups of the epoxy resin can be represented by the concept "hydroxyl functionality," which is understood to be the number of hydroxyl groups present per molecule plus twice the number of epoxy groups.

The molecular weight and thus also the value of $n$, identical to the number of hydroxyl groups per molecule, are dependent on the ratio of epichlorohydrin to 2,2-di(4-hydroxyphenyl)propane used for preparing the resins. In particular, resins in which the average value of $n$ is at least equal to 3 have proved to be very suitable base materials for the binder compositions to be prepared according to the invention.

Preference is given to polyglycidyl polyethers of 2,2-bis-4-hydroxyphenyl)propane having a molecular weight of 340–1000 and an epoxy equivalency of 170–600. Particularly preferred are polyglycidyl ethers of 2,2-bis-(4-hydroxyphenyl)propane having a molecular weight of 700–1000 and an epoxy equivalent weight of 400–600, in view of the most favorable ratio between epoxy groups and free hydroxyl groups.

Preferred fatty acids are the saturated or ethylenically unsaturated monocarboxylic acids containing from 6–30 carbon atoms or dicarboxylic acids which may be obtained by dimerization of these monocarboxylic acids, if unsaturated. Very suitable acids are the fatty acids derived from drying or semi-drying oils, as for example, linseed oil, china wood oil, soyabean oil, coconut oil, hempseed oil, cotton seed oil, rapeseed oil, kapok oil, perilla oil, oiticica oil, dehydrated castor oil, fish oil and blown linseed oil or linseed oil thickened by heating. The fatty acids derived from these oils as well as tall oil (a mixture of fatty acids and resin acids) can be very well used for the preparation of binder compositions for end products which have the property of drying in the air. Also suitable are the dimerized fatty acids, as for example, dimerized linseed oil or soyabean oil fatty acids.

Suitable saturated fatty acids are the acids containing at least 4 carbon atoms and preferably from about 6 to 26 carbon atoms, such as lauric acid, capric acid, palmitic acid, stearic acid, 2-ethylhexanoic acid, myristic, lignoceric, cerotic and caproic. Aliphatic acids in which the carboxyl groups are bound to tertiary and/or quaternary carbon atoms can also be used if binder compositions are envisaged for end products which can be cured by reaction with phenol-formaldehyde or amino-formaldehyde resins.

Suitable saturated aliphatic acids in which the carboxyl groups are bound to tertiary and/or quaternary carbon atoms are the alpha-branched, saturated, aliphatic monocarboxylic acids obtained by reacting formic acid or carbon monoxide and water, with olefins, or with paraffins in the presence of hydrogen acceptors such as olefins or compounds, such as alcohols and alkyl halides, from which olefins can be obtained by splitting off water or hydrogen halide, respectively, under the influence of liquid acid catalysts such as sulfuric acid, phosphoric acid or complex compositions of phosphoric acid, boron trifluoride and water. These saturated aliphatic moncarboxylic acids branched at the alpha position and prepared in this manner are sometimes called Koch acids in the art ("Carbonsaure-Synthese aus Olefinen, Kohlenoxyd und Wasser," Koch, Brennstoff-Chemie, November 1955, pages 321–328). Monocarboxylic acids branched at the alpha position can also be obtained according to Reppe's method. Of special value are the acids from mono-olefins containing 3 to 18 carbon atoms. Mixtures of olefins obtained by cracking paraffinic hydrocarbons, such as petroleum fractions, are preferably used as starting material. This mixtures may contain both branched and unbranched acyclic olefins as well as cycloaliphatic olefins. By the action of formic acid or of carbon monoxide and water, a mixture of saturated acyclic and cycloaliphatic monocarboxylic acids is obtained therefrom.

Preferably, these acids are obtained by reacting with carbon monoxide and water, olefins having at least 3 carbon atoms in the molecule. This reaction takes place under the influence of acid catalysts, for example, phosphoric acid, sulfuric acid and complexes of phosphoric acid with boron fluoride. The reaction is more thoroughly described in U.S. 3,059,004, issued Oct. 16, 1962. As indicated in this patent, the carboxyl group adds on at the double bond and even when the double bond is terminal, the addition is such that a strong tendency for tertiary groups to be formed by isomerization. Branching at the double bond also provides a tertiary carboxyl group. Very attractive products are obtained when mono-olefins having at least 8 and not more than 18 carbon atoms in the molecule are thus converted into monocarboxylic acids. Preferably, more than 10% of the monocarboxylic acids will be tertiary in the carboxyl group.

Preferred saturated aliphatic monocarboxylic acids which may be used in the present process have the general formula:

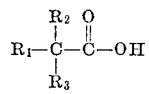

wherein $R_1$ and $R_2$ are the same or different alkyl radicals, $R_3$ is an alkyl radical or hydrogen. Particularly preferred monocarboxylic acids contain from 9 to 19 carbon atoms with 9 to 11 being especially preferred.

As stated above, the esterification reaction according to the invention is catalyzed by stannous oxide, stannous hydroxide or by a stannous salt of a weak acid, which for the present purpose is understood to be an acid, preferably an organic acid including carbonic acid, which in water has a dissociation constant not greater than $1.5 \times 10^{-3}$. These stannous salts can be very suitably salts derived from the same saturated or unsaturated fatty acids used for the esterification of the reactive groups of the epoxy resins. Such salts can be formed in the reaction mixture in situ by reaction of stannous oxide and/or stannous hydroxide with the fatty acids used for the esterification.

Examples of suitable salts of fatty acids are stannous stearate, palmitate, laurate, 2-ethylhexoate and stannous octoate. However, the process according to the invention is not restricted to the use of such fatty acid salts and other salts of organic acids, such as stannous acetate, butyrate, phenolate and carbonate can also be utilized.

The most efficient catalysis of the instant esterification reaction is obtained with the use of stannous oxide.

If desired, in addition to the stannous catalysts, other compounds giving an alkaline reaction, such as sodium carbonate, sodium hydroxide or potassium hydroxide can also be incorporated in the reaction mixture.

The esterification reaction will as a rule be performed under the conditions usual for this type of reaction, with or without the use of solvents such as toluene or xylene. Suitable reaction temperatures are between 150 and 300° C., and preferably between 200 and 265° C. The discharge of the water liberated during the reaction from the reaction mixture can be facilitated by stirring the mixture efficiently, if necessary, by blowing an inert gas through the reaction mixture such as nitrogen or carbon dioxide. Also, the water formed can be removed by azeotropic distillation with a small quantity of a suitable solvent, for example xylene.

The ratios of fatty acids and epoxy resins in the reaction mixture and the time in which the esterification is carried out can vary within wide limits, dependent on whether reaction products with many or few esterified reactive groups (long as short "oil length") are envisaged. In general, it can be stated that suitable compositions are obtained when 15–95% of the hydroxyl functionality of the epoxy resins is esterified.

As a rule the catalysts are used in concentrations of from 0.001 to 1.0 percent by weight, calculated on the weight of the epoxy resin, and preferably, the concentration of the catalysts is between 0.005 and 0.05 percent by weight.

The esterified reaction products obtained according to the invention may be worked up in any known way to paints, lacquers or varnishes, to which components such as pigments, thinners, driers, phenol-formaldehyde resins or amino-formaldehyde resins may be added. Also, before the paint compositions are made, the binders may be modified by reaction with di-or polycarboxylic acids and, if necessary, di-or polyvalent alcohols, or by reaction with styrene or vinyltoluene.

In order to illustrate the invention more fully some specific examples are given. The reactants, their proportions and other specific ingredients are presented as being typical and various modifications can be made in view of the foregoing disclosure and discussion without departing from the spirit or scope of the specification or of the claims. Unless otherwise stated, parts and percentages are by weight.

The epoxy resins used in the examples were condensation products of epichlorohydrin and 2,2-bis(4-hydroxyphenyl) propane having the following properties:

|  | Resin I | Resin II |
|---|---|---|
| Epoxy equivalent weight | 950 | 1,850 |
| Molecular weight | 1,400 | 2,900 |
| Average value of n | 3.7 | 8.8 |
| Softening point (Durrans' method) | 99 | 128 |

In all of the following experiments, the reactants, catalyst and solvent were placed in a reactor and cooked at the temperatures and for the times indicated hereinafter. In all instances nitrogen was passeed through the reactor and all water formed during the reaction was removed from the reaction mixture by azeotropic distillation with xylene.

EXAMPLE I

Experiment 1

Esterification recipe:
  Epoxy resin—resin I, 150 g.
  Fatty acid—dehydrated castor oil fatty acid, 100 g.
  Solvent—xylene, 9 g.
  Temperature—240° C.
  Time of reaction—max. 5 hours (incl. of a heating-up period of 1 hour).
  Catalyst—SnO, 15 mg.

During the reaction, samples were taken at the times stated in Table I to determine the acid value and viscosity of the reaction mixture. The acid value was determined in mg. KOH/g. and the viscosity was expressed in centistokes, measured in a 60% w. solution in xylene at 25° C.

Experiment 2

The esterification recipe was identical to that of Experiment 1 except that the catalyst was 45 mg. of stannous octoate.

Experiments 3–5

The esterification recipe was identical to that of Experiment 1 except that the catalyst in Experiment 3 was 15 mg. of ZnO, in Experiment 4, 50 mg. of NaOH; and in Experiment 5, no catalyst was used.

TABLE I

| | | Time, hours | | | | | | | | | | | | |
|---|---|---|---|---|---|---|---|---|---|---|---|---|---|---|
| | | 1 | | 1.5 | | 2 | | 2.5 | | 3 | | 4 | | 5 |
| Exp. | Catalyst | Acid value | Vis. | Acid value | Vis. | Acid value | Vis. | Acid value | Vis. | Acid value | Vis. | Acid value | Vis. | Acid value | Vis |
| 1 | SnO | 10 | 1,375 | 6.0 | 1,425 | 3.5 | 1,450 | 1.7 | 1,525 | 0.05 | 1,600 | ---- | 1,775 | ---- | 2,075 |
| 2 | $(C_7H_{15}COO)_2Sn$ | 10 | 1,380 | 6.0 | 1,430 | 3.5 | 1,460 | 1.7 | 1,535 | 0.05 | 1,620 | ---- | 1,825 | ---- | 2,100 |
| 3 | ZnO | 11.0 | 1,600 | 7.4 | 1,625 | 4.5 | 1,650 | 3.0 | 1,675 | 2.0 | 1,800 | 0.05 | 2,150 | 0.02 | 2,875 |
| 4 | NaOH | 12.0 | 1,050 | 8.5 | 1,100 | 6.0 | 1,150 | 4.6 | 1,200 | 3.1 | 1,200 | 1.5 | 1,200 | 0.02 | 1,200 |
| 5 | None | 12.0 | 1,375 | 8.5 | 1,450 | 6.0 | 1,550 | 4.5 | 1,625 | 3.5 | 1,750 | 1.8 | 2,000 | 0.02 | 2,250 |

From Table I it is apparent that the two tin compounds show a very rapid decline in acid value, while the viscosity of the reaction mixture does not increase to an unacceptably high value during esterification.

The ZnO used for comparison was found capable of effecting an attractive acceleration of the esterification reaction, but caused a very rapid rise in viscosity of the reaction mixture, as is apparent from the acid value and viscosity measurements. It will be noted that the NaOH has hardly any effect on the decrease of the acid value.

EXAMPLE II

Experiment 6

Esterification recipe:
  Epoxy resin—resin I, 150 g.
  Fatty acid—lauric acid, 70.1 g.
  Solvent—xylene, 9 g.
  Temperature—240° C.
  Time of reaction—max. 3 hours (incl. of 1 hour heating-up).
  Catalyst—SnO, 15 mg.

Experiment 7

The esterification recipe was identical to that of Experiment 6 except that the catalyst was omitted.

Experiment 8

Esterification recipe:
  Epoxy resin—resin I, 108.7 g.
  Fatty acid—linseed oil fatty acid, 141.2 g.
  Solvent—xylene, 9 g.
  Temperature—260° C.
  Time of reaction—max. 5 hours (incl. of 1 hour heating-up).
  Catalyst—SnO, 16 mg.

Experiment 9

The esterification recipe was identical to that of Experiment 8 except that the catalyst was omitted.

TABLE II

| Experiment | Time, hours | | | | | | | | | |
|---|---|---|---|---|---|---|---|---|---|---|
| | 1 | | 2 | | 3 | | 4 | | 5 | |
| | Acid value | Vis. | Acid value | Vis. | Acid value | Vis. | Acid value | Vis. | Acid value | Vis. |
| 6 | 6.0 | 1,625 | 3.25 | 1,550 | 0.1 | 1,500 | ---- | 1,450 | ---- | 1,400 |
| 7 | 7.5 | 1,675 | 5.25 | 1,625 | 3.5 | 1,575 | 2.0 | 1,500 | 1.0 | 1,450 |
| 8 | 19.5 | 600 | 11.0 | 620 | 8.0 | 670 | 3.7 | 760 | 0.1 | 870 |
| 9 | ---- | 690 | 17.0 | 710 | 12.5 | 730 | 9.8 | 790 | 7.9 | 875 |
| 10 | 13.5 | 1,750 | 5.0 | 1,800 | 0.15 | 2,190 | ---- | ---- | ---- | ---- |
| 11 | 18.8 | 1,450 | 11.0 | 1,460 | 6.6 | 1,460 | 4.1 | 1,470 | 2.1 | 1,475 |
| 12 | 20.5 | 1,510 | 13.4 | 1,511 | 9.1 | 1,510 | 6.8 | 1,510 | 5.5 | 1,512 |

Experiment 10

Esterification recipe:
  Epoxy resin—resin II, 150 g.
  Fatty acid—dehydrated castor oil fatty acid, 90 g.
  Solvent—xylene, 9 g.
  Temperature—240° C.
  Time of reaction—max. 5 hours (incl. 1 hour heating-up).
  Catalyst—SnO, 15 mg.

Experiment 11

Esterification recipe:
  Epoxy resin—resin I, 150 g.
  Fatty acid—dehydrated castor oil fatty acid, 100 g.
  Solvent—xylene, 9 g.
  Temperature—220° C.
  Time of reaction—max. 6 hours (incl. 1 hour heating-up).
  Catalyst—SnO, 15 mg.

Experiment 12

The esterification recipe was identical to that of Experiment 11 except that the catalyst was omitted.

The course of the acid value and the viscosity during esterification are represented in Table II. In Experiments 8 and 9 the viscosities were determined in a gasoline fraction (white spirit) at 25° C. In Experiment 10 the viscosity was measured in a 50% w. solution in xylene. The other viscosity determinations were performed as described in Example I.

A comparison of the values given for the course in acid value in the experiments according to the invention with those of the reference experiments clearly shows the great activity of the catalyst used. From the data on the changes in viscosity it is readily apparent that the use of the catalyst does not effect an undesirable large rise in viscosity.

We claim as our invention:

1. A process for the preparation of epoxy resin esters which comprises reacting at 150 to 300° C. (1) a polyepoxide containing more than one vic-epoxy group in the molecule with (2) a fatty acid containing from 6 to 30 carbon atoms in the presence of (3) from 0.001 to 1.0% by weight of the polyepoxide of a stannous compound selected from the group consisting of stannous oxide and stannous hydroxide, said polyepoxide and fatty acid being employed in amounts so that from 15% to 95% of the hydroxyl functionality of the epoxy resin is esterified.

2. A process as in claim 1 wherein the polyepoxide is a glycidyl polyether of a polyhydric compound selected from the group consisting of polyhydric alcohols and polyhydric phenols.

3. A process as in claim 1 wherein the polyepoxide is a glycidyl polyether of 2,2-bis(4-hydroxyphenyl)propane.

4. A process as in claim 3 wherein the glycidyl polyether contains at least 3 hydroxyl groups.

5. A process as in claim 1 wherein the fatty acid is an ethylenically unsaturated monocarboxylic acid.

6. A process as in claim 1 wherein the fatty acid is derived from drying or semi-drying fatty oils.

7. A process as in claim 1 wherein the stannous compound is stannous oxide.

References Cited

UNITED STATES PATENTS

| | | | |
|---|---|---|---|
| 3,287,297 | 11/1966 | Anselm et al. | 260—23 |
| 3,201,360 | 8/1965 | Proops et al. | 260—18 |
| 3,162,616 | 12/1964 | Dombrow et al. | 260—75 |
| 3,157,618 | 11/1964 | Le Bras et al. | 260—75 |
| 2,575,440 | 11/1951 | Bradley | 260—410.5 X |
| 2,456,408 | 12/1948 | Greenlee | 260—18 X |

FOREIGN PATENTS 999,947  7/1965  Great Britain.

OTHER REFERENCES

Chemical Abstracts, vol. 64:6569 g., 1966, "Improvement in Esterification Process."

Chemical Abstracts, vol. 63:11437 h, 1965, "Stannous Oxide Catalyzed Esterification."

DONALD E. CZAJA, Primary Examiner

C. W. IVY, Assistant Examiner

U.S. Cl. X.R.

260—47